United States Patent [19]

Willas

[11] 4,074,985
[45] Feb. 21, 1978

[54] AIR FILTER

[76] Inventor: Raymond Zeno Willas, 4343 N. Oak Park Ave., Chicago, Ill. 60634

[21] Appl. No.: 683,026

[22] Filed: May 4, 1976

[51] Int. Cl.² .............................................. B01D 46/24
[52] U.S. Cl. ........................................ 55/498; 55/501;
    55/502; 55/503; 55/510; 210/450; 210/455
[58] Field of Search ................. 55/497, 498, 501, 502,
    55/503, 510, 528, DIG. 16, DIG. 28; 210/450,
    451, 455, 457

[56] References Cited

U.S. PATENT DOCUMENTS

| 2,331,809 | 10/1943 | Sninsky ................................... 55/510 |
| 2,784,132 | 3/1957 | Maisel ..................................... 154/54 |
| 2,815,088 | 12/1957 | Gibel ...................................... 55/510 |
| 3,016,984 | 1/1962 | Getzin ..................................... 55/498 |
| 3,095,290 | 6/1963 | Hockett ................................... 55/510 |
| 3,226,917 | 1/1966 | Donovan et al. ....................... 55/276 |
| 3,399,516 | 9/1968 | Hough, Jr. et al. .................... 55/498 |
| 3,400,520 | 9/1968 | Sakurai ................................... 55/528 |
| 3,413,782 | 12/1968 | Bartlett ................................... 55/510 |
| 3,498,032 | 3/1970 | Scott ...................................... 55/498 |

FOREIGN PATENT DOCUMENTS

| 247,074 | 5/1966 | Austria ................................... 55/510 |
| 1,147,736 | 11/1957 | France ................................... 55/510 |

Primary Examiner—Frank W. Lutter
Assistant Examiner—David L. Lacey
Attorney, Agent, or Firm—Dominik, Knechtel, Godula & Demeur

[57] ABSTRACT

A readily disassembled filter assembly for a carburetor air intake housing, which assembly has upper and lower plastic, metal or rubber mounting rings with annular seating grooves on the interior sides, and such seating grooves snugly but removably receive an annular foraminous flame resister support and an elongated filter element wrapped around said support. The filtering element has a substantially uniform thickness substantially greater than that of the rigid foraminous support, and said filtering element having opposite regular sides which are unbroken. The mounting rings retain upper and lower portions of the foraminous support and wrapped filter element within the seating groove, but such mounting rings may be simply pulled apart so that the filtering element may be unwrapped for washing or replacement.

4 Claims, 7 Drawing Figures

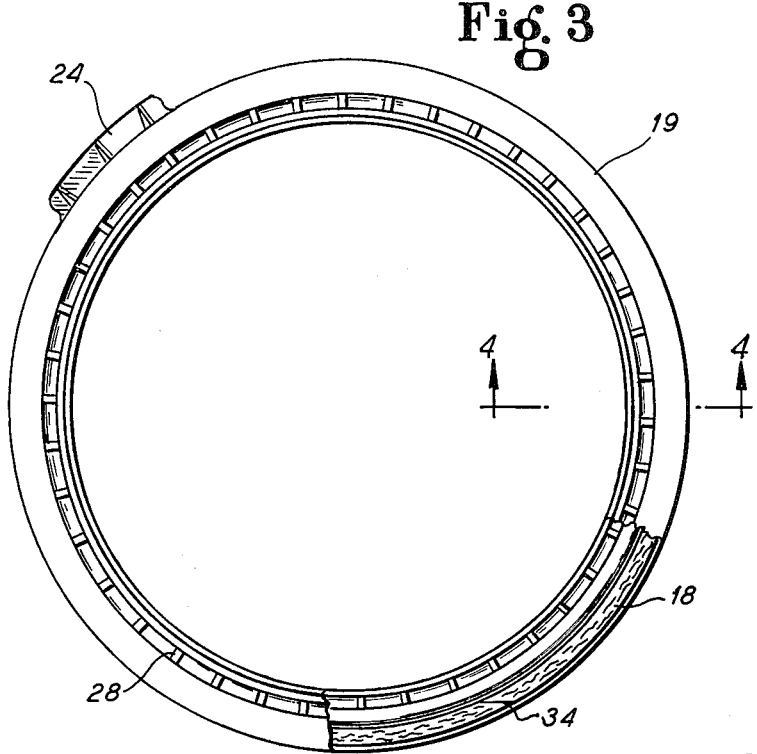
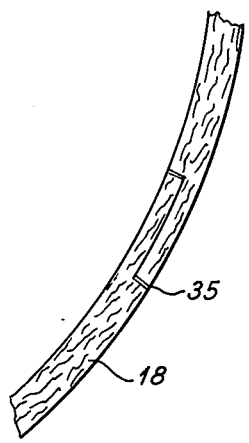
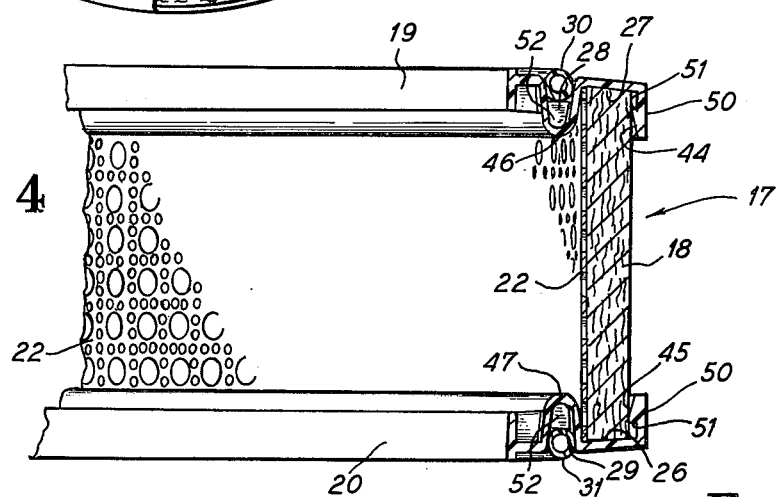
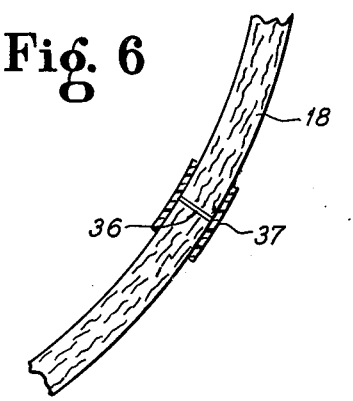
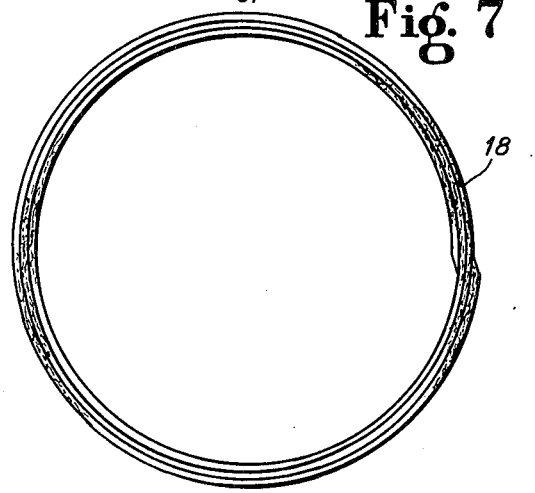

AIR FILTER

FIELD AND BACKGROUND OF THE INVENTION

This invention relates to filtering assemblies for carburetor air intake housings, which filter assemblies are not made to be discarded, but which filtering capacity may be renewed. In particular, the invention relates to a readily assembled and disassembled filter assembly in which a wrap around filter element may be easily removed and washed or replaced.

The art has concerned itself extensively with various filter assemblies, including those specifically designed for a carburetor air intake housing. The conventional and popular air filter element generally provides permanently fixed upper and lower mounting rings and a pleated paper filter element bonded or embedded within said rings. A representative filter element having such general features is shown, for example, in U.S. Pat. No. 3,226,917. The art has also considered various approaches utilizing economical plastic materials for making filter elements such as shown in U.S. Pat. No. 3,355,863.

No art was uncovered which teaches the features that lead to the objects and advantages which will now, in part, be ennumerated.

OBJECTS AND ADVANTAGES OF THE INVENTION

An object of the present invention is to provide an economical air filter assembly which can be readily assembled and disassembled without requiring fasteners, locking elements, or the like; such assembly and disassembly serving advantages of quickly removing a wrap around filtering element for cleaning or replacing.

Another object of the present invention is a readily assembled and disassembled filter assembly which utilizes a wrap around filter material of relatively constant thickness and height, as well as regular inside and outside surfaces so that said filtering element may be tucked in retaining relationship within seating grooves in spaced plastic mounting rings. It is a feature of this advantage that the combined thickness of the filtering element and a rigid foraminous support are such that there is a slight compressing fit of the filtering element in the seating grooves so that the combined support and filtering element are retained with the seating grooves, but may be readily withdrawn by separating the rings. It is yet another feature and advantage that the mounting rings may be provided with means to enhance the removable retaining action of the mounting rings relative to the filtering element.

Still yet another object of the present invention is a filter assembly of the type described in which the filtering element, before installation, is an elongated rectangular flexible member that can be easily manipulated for washing by hand or in a machine; and which form further allows simple assembly by wrapping around an annular foraminous support prior to engaging seating grooves in opposite plastic, metal, or rubber mounting rings. The wrap around filter element additionally leads to advantage in that the length of the filtering element is selected relative to the annular formainous support so that the opposite ends of the filter element are adjoined in abutting relationship to provide an effective continuous filtering area in the filter assembly. Such flexible filtering element allows other sealing means to be used at the adjoining ends of the wrap around filtering element, such as lap joints, taping, or the like.

The foregoing objects and advantages are realized, together with still other objects and advantages, by considering the disclosure of the following invention which includes drawings wherein:

FIG. 3 is a top plan view of the assembled filter assembly, with portions removed, and on a reduced scale relative to FIG. 2.

FIG. 4 is a sectional view, on an enlarged scale, taken along line 4—4 of FIG. 3.

FIG. 5 is a portional sectional view of the flexible filtering material showing its adjoined ends in overlapping sealing relationship.

FIG. 6 is a view similar to that of FIG. 5, but showing the adjoining ends abutting and sealed with added tape members.

FIG. 7 is a sectional view of a flexible filtering element taken along a plane which is perpendicular to the axis of the filtering assembly, and showing an alternative overlapping of the flexible filtering element to provide an effective continuous filtering surface.

SUMMARY OF THE INVENTION

A filter assembly is now provided in which preformed plastic, metal or rubber mounting rings are of identical design and construction, and can be alternatively used as an upper or lower mounting ring. The interior sides of such mounting rings have annular seating grooves of substantially uniform width which snugly retain the bottom portions of a substantially rigid foraminous support and a flexible filtering element wrapped around said support. The filtering element has a height substantially equal to that of the rigid foraminous support, and the long axis of the filtering element is about the same as the circumference of the annular rigid foraminous support. This allows the flexible filtering element to be wrapped around the foraminous support so that the opposite ends of the flexible filtering element either adjoin in abutting relationship or in overlapping relationship.

The flexible filtering element has a substantially uniform thickness and the opposite sides are regular, that is, substantially unbroken or flat. The unassembled filtering element therefore resembles an enlongated pad, and this configuration leads to important advantages in that the flexible filtering element may be readily wrapped around the rigid foraminous support and be compressingly fitted into the opposite annular seating grooves of the mounting rings. A continuous unbroken outside surface of the filtering element cleans the incoming air, and the opposite continuous unbroken inside surface of the filtering element snugly follows the annular wall of the rigid foraminous support. The width of the annular seating grooves are so related, relative to the combined widths of the flexible filtering element and the rigid support, that a snug and retaining fit is realized by simply pressing the mounting rings against the assembled filtering element and foraminous support. The filtering assembly is disassembled by simply manually pulling or snapping apart said mounting rings.

DETAILED DESCRIPTION OF THE INVENTION

Figure 1:
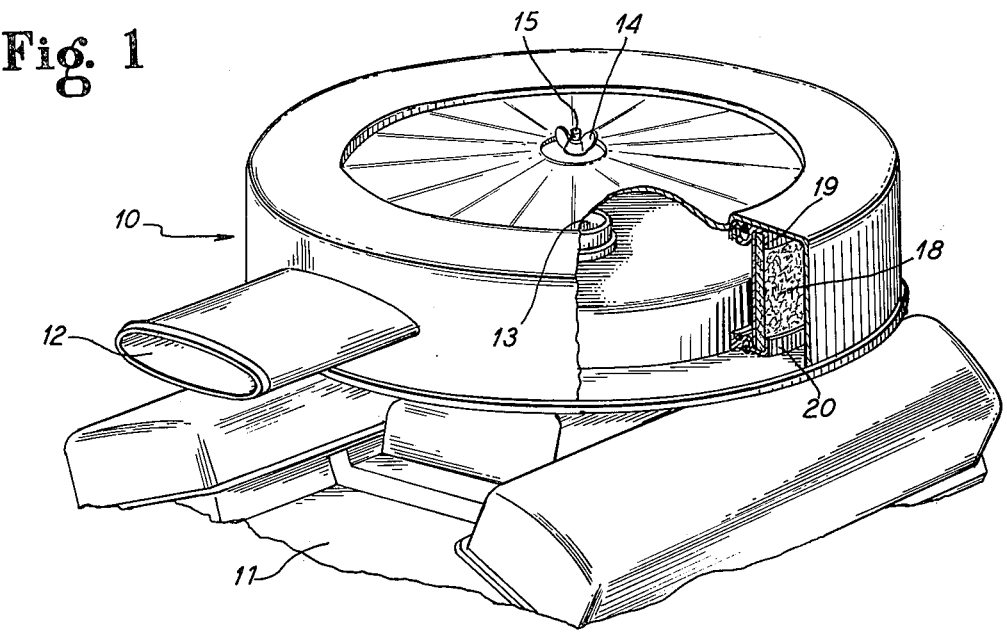
FIG. 1 is a perspective view showing a carburetor air intake housing with a cut away portion indicating the filter assembly.

FIG. 1 shows a typical application for the air filter assembly. An air filter housing 10 is mounted generally on top of a carburetor air inlet 13, which is part of an internal combustion engine 11. Air enters the air filter housing 10 through an air inlet 12. The air filter housing 10 is securely fastened to the carburetor air inlet 13 by means of a bolt 15 which extends generally upward through the center of the carburetor air inlet 13 and the air filter housing 10. A wing nut 14 screws onto the bolt 15 holding the air filter housing 10 tightly against the carburetor air inlet 13. Such air filter housing assemblies are of conventional design and are not included as part of this invention.

As the air passes through the air inlet 12, it will be filtered by an air filter element 18 which is retained between an upper mounting ring 19 and a lower mounting ring 20. The design of the air filter assembly is such that all air passing into the carburetor air inlet 13 must be filtered by the filtering element 18. The means for sealing the upper and lower mounting rings 19 and 20 against the air filter housing 10 so that all air must pass through the filtering element 18 will be further described below.

Figure 2:
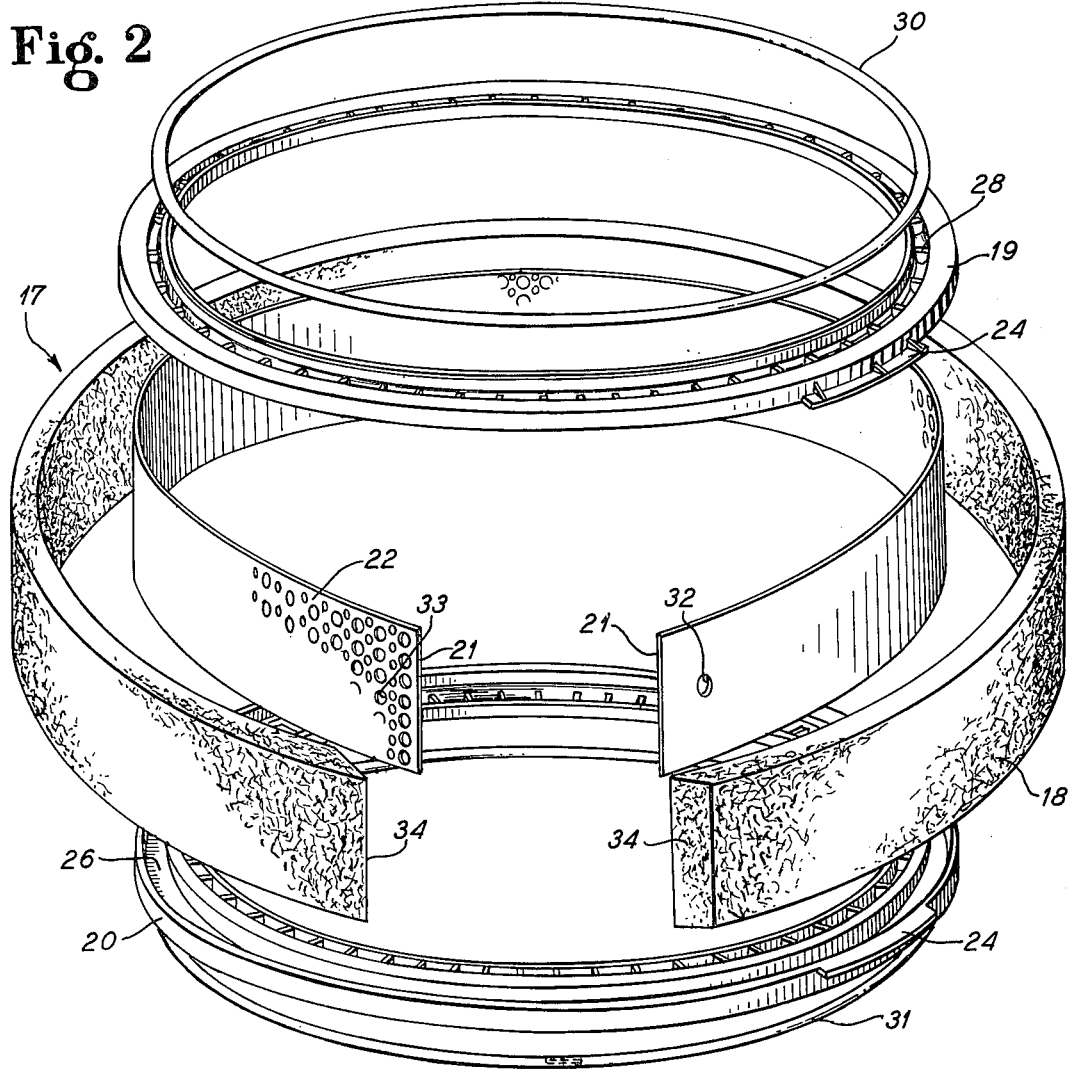
FIG. 2 is an exploded perspective view of the filter assembly on an enlarged scale relative to FIG. 1.

FIG. 2 shows more clearly the structure and assembly of a filter assembly 17. First it will be noted that there is an upper mounting ring 19 and a lower mounting ring 20 generally molded or formed from a plastic, rubber or metal material. Each mounting ring has an exterior side and an interior side relative to an annular foraminous support 22 and filtering element 18.

The annular foraminous support 22 is made of metal and serves three functions. The first is to provide support to the filtering element 18 which is wrapped around the outside circumference of said foraminous support 22. This gives the filter assembly 17 structural support as a complete assembly. Secondly, the foraminous support 22 spaces the upper mounting ring 19 and the lower mounting ring 20 the proper distance apart so that the filter assembly 17 has a proper height dimension to fit correctly into the air filter housing 10. The third function of the foraminous support is to protect the filtering element 18 from burning or singeing due to any backfiring which sometimes occurs in the air filter housing or carburetor air inlet 13 in internal combustion engines. Said foraminous support 22 cools the flame sufficiently to keep the filtering element 18 from any such burning or singeing.

The foraminous support 22 can be manufactured in any one of a number of ways. The most economical and practical method is to use a metallic foraminous sheet, rectangular in dimension, and join each end 21 of the foraminous support 22. The ends 21 can be fastened by butting together and welding; an alternative method of joining the support ends 21 is to overlap said ends and use a fastening means passing through a fastener hole 32 on one of the support ends 21 into a mating fastener hole 33 into the other support end 21. Alternative methods of joining the support ends 21 such as welding, adhesives, or other commercially available joining can be used. It is important that the foraminous support 22 be cylindrical or annular in construction and the diameter of said support must be closely dimensioned to fit along the inside portion of an upper seating groove 27 and a lower seating groove 26 which can be seen in FIG. 4. A more detailed description of the dimension of the support will be explained below.

It can also be seen in FIGS. 2 through 4 that the filtering element 18 is wrapped around the outer wall of the annular foraminous support 22, and the length of the filtering element 18 is such that the opposite ends of the filter element are adjoined in abutting relationship to provide an effective continuous filtering area in the filter assembly. FIG. 3 shows a lap joint 34, however, other types of joints could also be used. FIG. 5 shows a rabbit joint 35 and FIG. 6 shows a butting joint 36 with additional sealing means such as a tape material 37. FIG. 7 shows an alternative overlapping of the flexible filtering element to provide an effective continuous filtering surface.

The filtering element 18 is generally manufactured from a high loft bonded polyester fiber or foamed polyurethane but other filtering materials could be used as long as the material has the requisite internal rigidity to be flexibly mounted to the annular foraminous support 22 and retain its configuration on the support.

The design of the upper and lower mounting rings 19 and 20, and the filter assembly 17, can best be seen in FIG. 4. The said mounting rings are of a continuous single plastic, rubber or metallic piece. From the outermost edge of the mounting ring there is first an outer skirt 50 of which the exterior wall is parallel to the vertical axis of the filter assembly and of substantially the same height dimension as the interior of the mounting ring. The interior wall of the skirt 50 serves the dual function of first being the outer portion of the upper seating groove 27 or the lower seating groove 26, and second, creating the means for the compression or wedging fit between the outer skirt 50 and the filtering element 18. On the upper mounting ring 19 there is an upper biting edge 44 on the interior wall of the outer skirt 50. Similarly, on the lower mounting ring 20 there is a lower biting edge 45. Said biting edge is a continuous angle formed by a shoulder 51 which is intermediate the top and bottom of the outer skirt 50 and a tapered side which extends between such shoulder 51 and the bottom of the outer skirt 50, the plane of said shoulder 51 being perpendicular to the axis of said filter assembly 17.

The top of the skirt bends inwardly toward the center of the filter assembly, forming a plateau substantially perpendicular to the vertical axis of the filtering element, creating the top or bottom of the seating grooves 27 and 26 respectively. The plateau on the upper ring 19 then dips downwardly at substantially a 90° angle for a distance substantially the same as the height of the outer skirt 50 before it reverses direction going inwardly upward creating a trench 52 in the upper ring 19. Upper supports 28 cross the trench 52 a predetermined distance below the top of the upper mounting ring 19 so that an upper O-ring 30 projects above the mounting ring when in place. The outer wall of the trench 52 forms the inner wall of the upper seating groove 27. Similarly, lower supports 29 cross the trench 52 a predetermined distance above the bottom of the lower mounting ring 20 and a lower O-ring 31 projects below the lower mounting ring 20.

The outer diameter of the annular foraminous support 22 must be substantially the same as the diameter of the outer wall of the trench 52 on the mounting ring. This is indicated in FIG. 4 where the foraminous support 22 is positioned adjacent and touching the outer trench wall consisting of, an upper circumferential positioning element 46 on the upper mounting ring 19. The lower mounting ring 20 has a similar lower circumferential positioning element 47.

The filtering element is wrapped around the foraminous support 22, placed against the lower circumferential positioning element 47 and in the lower groove 26 and the upper mounting ring is then pushed over the top of the filtering element 18 and foraminous support 22, seating both elements within the upper seating groove 26.

The o-rings are then placed on the upper and lower supports 28 and 29, and the complete assembly is put into the air filter housing 10. The purpose of the O-rings is to form a seal between the air filter housing 10 and the filter assembly 17 with the result that all air entering the air inlet 12 will have to be filtered by the filtering element 18 before entering the carburetor air inlet 13 and cannot bypass said filtering elements.

In FIGS. 2 and 3 there is also shown a grasping portion 24 on both the upper mounting ring 19 and the lower mounting ring 20. This allows the user of the filter assembly a convenient means to pull the rings apart to remove and clean or replace the filter element 18.

The upper and lower mounting rings 19 and 20 are identical in design and dimension, eliminating the need for concern of the user as to which ring must be positioned as an upper ring and which as a lower ring. This also results in an economic advantage in manufacturing.

Although particular embodiments of the invention have been shown and described in full here, there is no intention to thereby limit the invention to the details of such embodiments. On the contrary, the invention is to cove all modifications, alternative embodiments, usages and equivalents of a filtering assembly as fall within the spirit and scope of the invention, specification, and the appended claims.

What is claimed is:

1. An air filter assembly which can be readily disassembled to permit the filtering element thereof to be removed for washing or replacement, said filter assembly being mounted within an air filter housing, and comprising an annular substantially rigid foraminous support having a substantially constant height, an elongated flexible filtering element having opposite ends and a height substantially the same as the height of said foraminous support, said filtering element having a substantially uniform thickness defined by outside and inside substantially regular surfaces, the length of said elongated filter element being substantially equal to the circumference of said foraminous support, said filtering element being freely wrapped around said foraminous support and being readily separable therefrom, upper and lower integrally molded mounting rings which are of a like construction and are interchangeable, said upper and lower mounting rings each having an exterior side and an interior side relative to said foraminous support and filtering element, an annular seating groove on the interior side of said upper and lower mounting rings, a continuous sealing trench inwardly of said annular seating groove which is located on the interior side of each mounting ring, and an O-ring member positioned by O-ring supports radially crossing said sealing trench a predetermined distance below the top of said mounting ring so that the O-ring member projects above the mounting ring when in place, said O-rings sealingly engaging said air filter housing enclosing said air filter assembly, the continuous top portions and the continuous bottom portions of said foraminous support and wrappped filtering element being snugly and removably seated in said annular seating grooves of said upper and lower mounting rings respectively, whereby said upper and lower mounting rings are readily separable from said filtering element and said filtering element is readily separable from said foraminous support permitting said filterng element to be removed for washing or replacement.

2. An air filter assembly as in claim 1 wherein the opposite ends of the elongated flexible filtering element includes means to seal the seam formed by said opposite ends to thereby prevent contaminants bypassing the flexible filtering element.

3. An air filter assembly as in claim 1 wherein a continuous skirt portion extends inwardly from the periphery of said mounting rings relative to the foraminous support and flexible filtering element wrapped therearound, and wherein each skirt portion has a lateral biting edge element which grips in deforming relationship the outside surface of the flexible filtering element.

4. An air filter assembly as in claim 3 wherein said lateral biting edge is a continuous angle on each skirt portion, said angle formed by a shoulder which is intermediate the top and bottom of the skirt portion and a tapered side which extends between such shoulder and the bottom of the skirt portion, the plane of said shoulder being perpendicular to the axis of said filter assembly.

* * * * *

UNITED STATES PATENT OFFICE
CERTIFICATE OF CORRECTION

PATENT NO. : 4,074,985
DATED : February 21, 1978
INVENTOR(S) : RAYMOND ZENO WILLAS It is certified that error appears in the above-identified patent and that said Letters Patent are hereby corrected as shown below:

Page 1, under the Inventor section,

The city of "Chicago" should be deleted and

-- Harwood Heights-- substituted therefor

Signed and Sealed this

Twenty-second Day of August 1978

[SEAL]

Attest:

RUTH C. MASON
Attesting Officer

DONALD W. BANNER
Commissioner of Patents and Trademarks